(12) United States Patent
Jones

(10) Patent No.: US 11,467,987 B1
(45) Date of Patent: Oct. 11, 2022

(54) COMPUTATIONAL PIPELINES FOR COMPUTATIONAL STORAGE DEVICES

(71) Applicant: Seagate Technology LLC, Fremont, CA (US)

(72) Inventor: Marc Tim Jones, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 6 days.

(21) Appl. No.: 17/218,533

(22) Filed: Mar. 31, 2021

(51) Int. Cl.
*G06F 13/16* (2006.01)
*G06F 13/42* (2006.01)
*G06F 9/445* (2018.01)

(52) U.S. Cl.
CPC ...... *G06F 13/1668* (2013.01); *G06F 9/44594* (2013.01); *G06F 13/4282* (2013.01); *G06F 2213/0026* (2013.01)

(58) Field of Classification Search
CPC ...................................................... G06F 21/10
See application file for complete search history.

(56) References Cited

U.S. PATENT DOCUMENTS

| 2019/0173841 | A1 | 6/2019 | Wang et al. |
| 2020/0274952 | A1 | 8/2020 | Waskiewicz et al. |
| 2020/0327071 | A1 | 10/2020 | Arcangeli et al. |
| 2021/0026751 | A1 | 1/2021 | Larkin et al. |

*Primary Examiner* — Henry Tsai
*Assistant Examiner* — Juanita Borromeo
(74) *Attorney, Agent, or Firm* — Holzer Patel Drennan

(57) ABSTRACT

The technology disclosed herein provides a method including generating, at a PCIe interface, a functional capability table associating a plurality of computational functionalities (CFs) with a plurality of computational storage devices (CSDs) communicatively connected to each other via the PCIe interface, communicating the functional capability table to each of the plurality of CSDs, receiving, at a first of the plurality of CSDs (CSD1), a request for a computational process including the plurality of CFs, determining that a first of the CFs (CF1) is associated with the CSD1 and a second of the CFs (CF2) is associated with a CSD2, requesting a computational program memory (CPM2) at the CSD2 and performing the CF1 at CSD1.

20 Claims, 6 Drawing Sheets

COMPUTATIONAL PIPELINES FOR COMPUTATIONAL STORAGE DEVICES

BACKGROUND

A computational storage device (CSD) is a storage device that provides persistent data storage and computational services. Computational storage is about coupling compute and storage to run applications locally on the data, reducing the processing required on the remote server, and reducing data movement. To do that, a processor on the drive is dedicated to processing the data directly on that drive, which allows the remote host processor to work on other tasks. Berkeley Packet Filter (BPF) is a technology used in certain CSD systems for processing data. It provides a raw interface to data link layers, permitting raw link-layer packets to be sent and received. eBPF (or Enhanced Berkeley Packet Filter) describes an computing instruction set (CIS) that has been selected for drive-based computational storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for building computational pipelines for increased performance of computational storage devices (CSDs), the method including generating, at a PCIe interface, a functional capability table associating a plurality of computational functionalities (CFs) with a plurality of computational storage devices (CSDs) communicatively connected to each other via the PCIe interface, communicating the functional capability table to each of the plurality of CSDs, receiving, at a first of the plurality of CSDs (CSD1), a request for a computational process including the plurality of CFs, determining that a first of the CFs (CF1) is associated with the CSD1 and a second of the CFs (CF2) is associated with the CSD2, requesting a computational program memory (CPM2) at the CSD2, performing the CF1 at CSD1 and storing the output of the CF1 at the CPM2 and communicating a command to the CSD2 to initiate CF2 on the CPM2.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
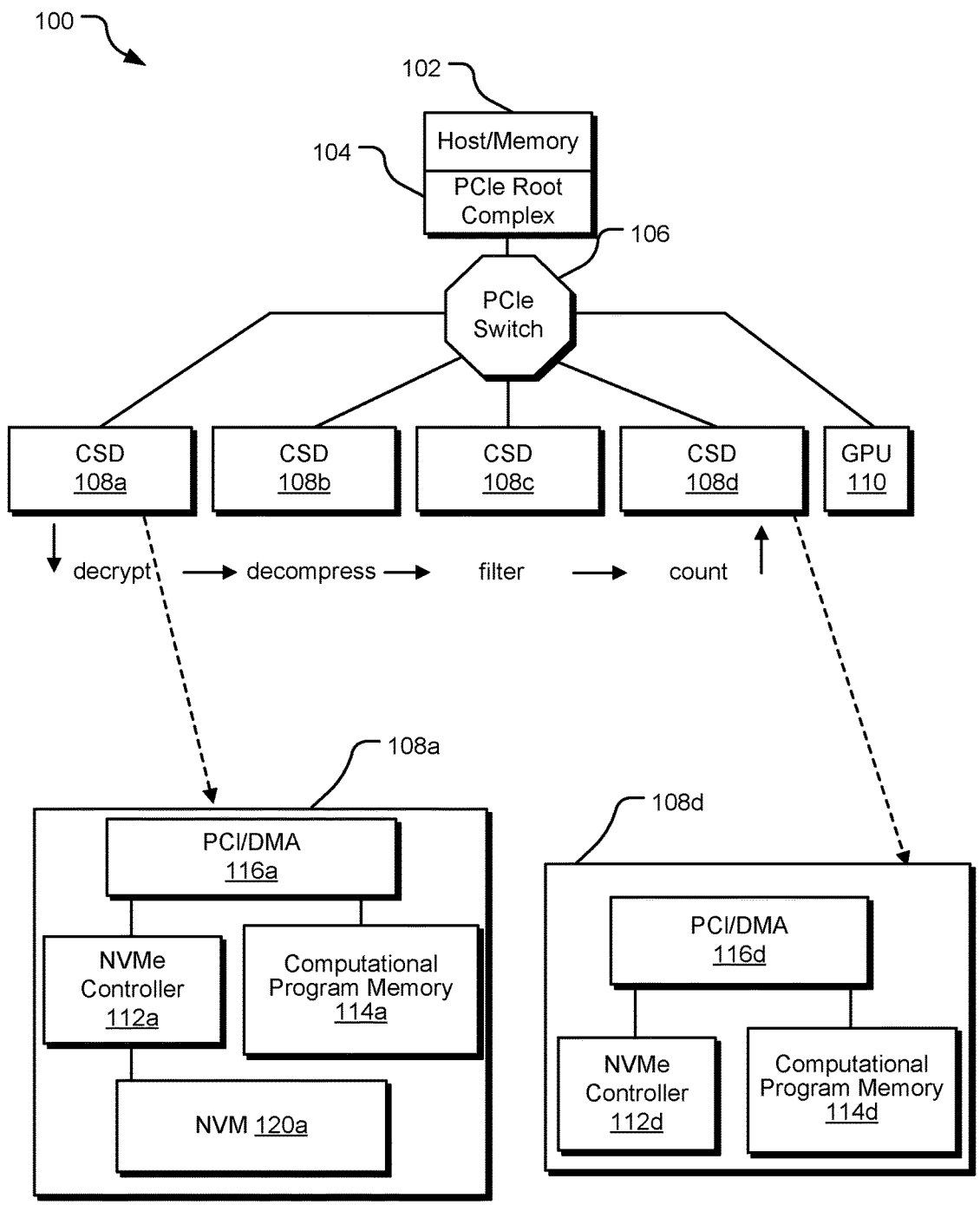
FIG. 1 illustrates a schematic diagram of an example system for building computational pipelines for increased performance of computational storage devices (CSDs).

A computational storage device (CSD) is a storage device that provides persistent data storage and computational services. Computational storage is about coupling compute and storage to run applications locally where the data resides, reducing the processing required on the remote server, and reducing data movement. To do that, a processor on the drive is dedicated to processing the data directly on that drive, which allows the remote host processor to work on other tasks. Berkeley Packet Filter (BPF) is a technology used in certain CSD systems for processing data. It provides a raw interface to data link layers, permitting raw link-layer packets to be sent and received. eBPF (or Enhanced Berkeley Packet Filter) describes an computing instruction set (CIS) that has been selected for drive-based computational storage.

The promise of computational storage systems is to process data faster by pushing computation closer to the data (for example, at the CSDs such as a solid state drive). But this processing may not necessarily be a single step but a series of steps of processing that further refines the data result. For example, consider the problem of identifying a number of records that match a given constraint. Here, a first step is to filter the records given some constraint. The resultant filtered dataset may then be counted to produce the final result. In one implementation disclosed herein, instead of a host directing this action, a pipeline of operations can be provided as one command and then the result provided upon completion of the pipeline of operations.

The implementations disclosed herein are directed to building computational storage pipelines for increased performance of the CSDs. In one example implementation where a host is communicating with a plurality of CSDs via a PCIe switch, where the plurality of CSDs are configured to advertise their computational capabilities via the PCIe switch. For example, one of the CSDs may include eBPF program capable of encrypting data and another of the CSDs may include eBPF program for generating hash. Alternatively, a CSD capability discovery engine configured at the PCIe switch performs a discovery process to determine computational capabilities of the CSDs and the discovered capabilities are communicated to all the CSDs. The CSDs are then configured to function in a peer-to-peer (P2P) fashion to communicate with each other through the PCIe switch.

Subsequently, in response to receiving a request from the host to perform a series of operations including encryption and hash generation, at a first CSD, the first CSD may determine if any of the encryption and hash generation are local or remote programs (on another CSD). If it determines that encryption is local and hash generation is remote, it requests the CSD 2 to allocate computational program memory (CPM2) and (a) copies its encrypted output directly to the CPM2 using the PCIe switch and (b) notifies to the CSD2 to activate the hash generation on the CPM2 data or activates the hash generation on the CSD2 via the PCIe switch.

Furthermore, the discovery process can also yield a drive with open program slots for use. In this case, if a particular program isn't available on a drive that is necessary to build a computational pipeline, CSD1 may migrate a program from itself (or another drive) to CSD2. In the example shown below, the hash computational program isn't available on CSD2, so CSD1 copies the hash program from CSD1 to CSD2 in order to build a computational pipeline.

FIG. 1 illustrates a schematic diagram of an example system 100 for building computational pipelines for increased performance of computational storage devices (CSDs) of a PCIe fabric. Specifically, the system 100 includes a host 102 communicating using a PCIe root complex 102 and a PCI switch 106 with a number of CSDs 108 (namely, 108a-108d) and a graphical processing unit (GPU) 110. For example, the CSDs 108 may be SSDs or HDDs with computational capabilities. The data may be read from one of the CSDs 108, processed, and the resulting output may be written through the PCIe switch 106 to another of the CSDs 108. In one implementation, the GPU 110 may also be a processor of data using a deep learning algorithm. For example, an eBPF program may read and prepare an image, which is fed into the GPU 110 to detect faces within the image.

Each of the CSDs 108 may include an NVM controller 112, a computational program memory (CPM) 114, and a PCI/DMA (direct memory access) card 116. The PO/DMA card 116 may allow the CSDs 108 to communicate with the host via the PCIe switch 106. Additionally, one or more of the CSDs 108 may also include NVMs 120 that may be used to store the output of the execution of the one or more of the programs in the CPMs 114a. The CPMs 114 may store one or more programs that can be used to process data on the CSDs 108. For example, the CPMs 114 may store eBPF modules that may process data on the CSDs and generate output that is communicated to the host 102 via the PCIe switch 106 or that may be communicated to another of the CSDs 108.

In one implementation, each of various CSDs 108 may have programs that specialize in specific computational functionalities. As an example, the CSD 108a may have one more computational programs with computational functionality for filtering data, the CSD 108c may have one more computational programs with computational functionality for encrypting data, etc. In one implementation, each of the CSDs 108 communicates their computational functionalities to the other of the CSDs 108. For example, in one implementation, each of the CSDs 108 may advertise their computational functionalities to the other of the CSDs 108 at the time of the initiation of their setup with the PCIe switch 106. In an alternative implementation, the host 102 may also participate in the advertising transaction. For example, as part of the enumeration of the CSDs 108, the host 102 may identify the computational functionalities on the various CSDs 108 and communicate them to the other CSDs 108.

Alternatively, the computational functionalities of the CSDs 108 may communicate in response to a computational functionality discovery request communicated by the PCIe switch 106 to each of the CSDs 108. Alternatively, the CSDs 108 may communicate the response to other CSDs 108 using the PCIe switch 106 functioning in a peer-to-peer configuration. Subsequently, the PCIe switch 106 may communicate the computational functionality capabilities of the various CSDs 108 to all the other CSDs 108. In one implementation, the PCIe switch 106 may generate and store a computational functionality capability table at the PCIe switch 106 that may be updated any time a new CSD is added to the CSDs 108. In such implementation, the PCIe switch 108 may also advertise the updated computational functionality capabilities table to all CSDs in response to any update to the computational functionality capabilities table.

In one implementation, the computational functionality capabilities table may also store the size of the NVM available at each of the CSDs 108 as well as the processing power capabilities of the various NVMe controllers 112. The NVMe controllers 112 of the CSDs 108 may be configured to use the computational functionality capabilities table, either at the PCIe switch 106 or as downloaded to the CSDs 108, to communicate computational tasks to one of the other CSDs 108. For example, the CSD 108a may receive a request for a computational process on the data stored on the NVM 120. For example, such a computational process may include a series of operations including decrypting data, decompressing the decrypted data, filtering the decompressed data, and counting the filtered data.

In response, the NVMe controller 112a may determine, that the CSD 108b has capacity to decompress data, CSD 108c has capability for filtering data, and the CSD 108d has the capability for counting data. As a result, the NVMe controller 112a may request use of the CPM 114b (not shown), CPM 114c (not shown) at CSD 108c, and the CPM 114d at the CSD 108d. Subsequently, the NVMe controller 112b may respond to the NVMe controller 112a with the permission to process data using the CPM 114b. Similarly, the NVMe controller 112c may respond to the NVMe controller 112a with the permission to process data using the CPM 114c, and the NVMe controller 112d may respond to the NVMe controller 112a with the permission to process data using the CPM 114d. Alternatively, the CSD 108a may process an operation of the computational process, such as decrypting, and write the decrypted output to the NVM of next CSD, such as the CSD 108b. Subsequently, the NVMe controller 112a may instruct the NVMe controller 112b of the CSD 108b (not shown) to perform the next operation of the computational process, which may be a decompressing operation, on the decrypted output stored on the NVM of the CSD 108b.

Thus, in effect, a pipeline of operations may be built between the series of CSDs 108 such that the results of the computational function of one of the CSDs 108 are written to the NVM of another of the CSDs 108 for further processing. Thus, the NVMe controllers 112 of the CSDs may in effect self-organize based on their computational functional capabilities to process data efficiently.

Figure 2:
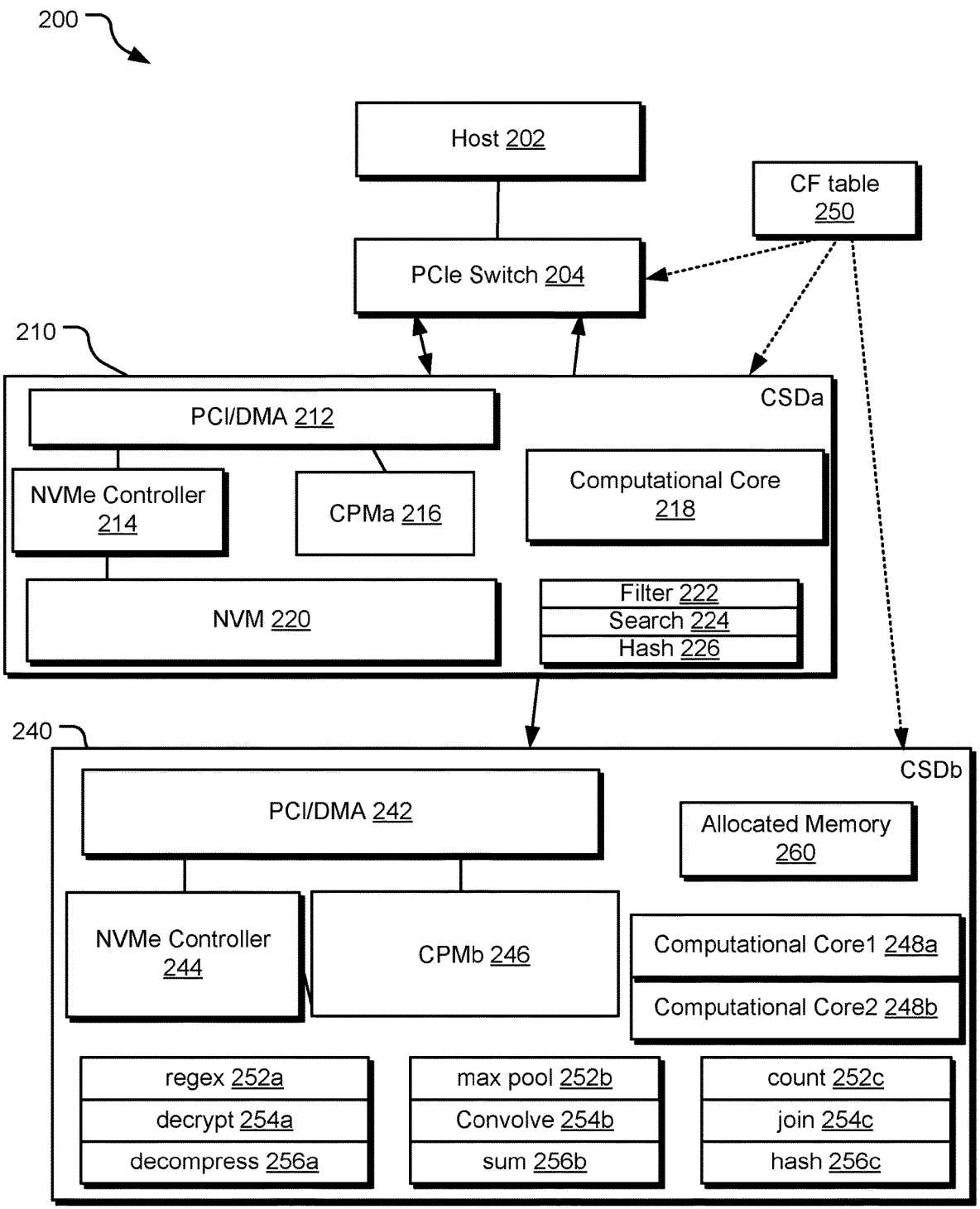
FIG. 2 illustrates an alternative schematic diagram of an example system for building computational pipelines for increased performance of computational storage devices (CSDs).

FIG. 2 illustrates an alternative schematic diagram of an example system 200 for building computational pipelines for increased performance of computational storage devices (CSDs). The illustrated implementation shows two CSDs, CSDa 210 and CSDb 240 connected to a host 202 via a PCIe switch 204. CSDa 210 may include a PO/DMA module 212 that allows the CSDa 210 to communicate with the PCIe switch 204, an NVMe controller 214, a CPMa 216, a computational core 218, an NVM 220. The CPM 216 may be equipped with various computational programs, including a filter program 222, a search program 224, and a hash program 226.

On the other hand, the CSDb 240 may be equipped with a PO/DMA module 242 that allows the CSDa 240 to communicate with the PCIe switch 204, an NVMe controller 244, a CPMb 246, a computational core 248a, and a computational core 248b. Additionally, the CSDb 240 may be configured to provide computational capability for various functionalities, including a regex function 252a, a decrypt function 254a, a decompress function 256a, a maxpool function 252b, a convolve function 254b, a sum function 256b, a count function 252c, a join function 254c, and a hash function 256c.

In an example use case of the CSDs 210, 240, the host 202 may request the CSDs 210, 240 to perform a set of operations on an LBA range of data on CSDa 210. In this case, the host 202 sends the request to the CSDa 210 via the PCIe switch 204. For example, the request may require the functionalities of filter and count. As CSDa 210 contains a filter program, it reads the data from the media on CSDa 210 into its CPMa 216. Furthermore, CSDa 210 also inventories whether it has access to a count program, either locally or remotely. The CSDa 210 determines, using a functional capability table 250 prepared by the system 200, that it does not contain the count program, but that it is available on the CSDb 240. In one implementation, the functional capability table 250 may be prepared by the system 200 and a copy of the functional capability table 250 may be stored on each of the CSDa 210, CSDb 240, and the PCIe switch 204. Alternatively, the PCIe switch 204 may merely function as a point-to-point router of packets among various CSDs.

Subsequently, CSDa 210 requests for allocation of space on CSDb 240 for the count operation. In response, CSDb 240 allocates memory 260 for use by the pipeline of operations. As data is read into the CPMa 216, it is processed using the filter program 222 and when the filtering operation is complete, the resulting data is DMA'd to the allocated memory 260 in the CSDb 240 using P2P DMA operation. CSDa 210 notifies CSDb 240 of the data in the allocated space 260. Subsequently, the NVMe controller 244 of the CSDb 240 performs the count operation using the count program 252c on the data in the allocated memory 260. Once the count operation is complete and the output is stored on the allocated memory 260 of CSDb 240, CSDb 240 DMAs the resulting data back to CSDa 210 using a P2P DMA operation. These operations between CSDa 210 and CSDb 240 are also further disclosed below using the sequence diagrams in FIG. 4.

Figure 3:
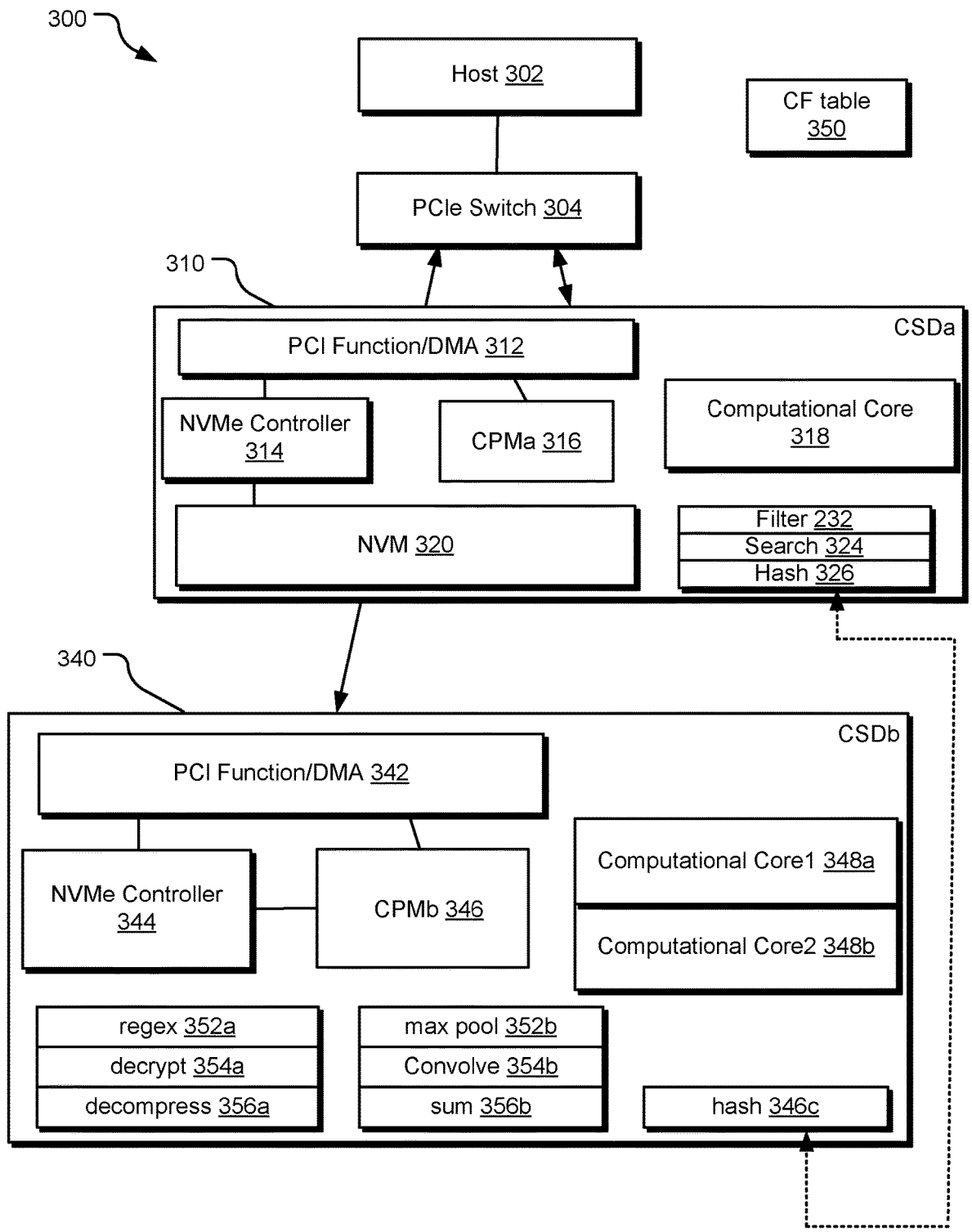
FIG. 3 illustrates another alternative schematic diagram of an example system for building computational pipelines for increased performance of computational storage devices (CSDs).

FIG. 3 illustrates an alternative schematic diagram of an example system 300 for building computational pipelines for increased performance of computational storage devices (CSDs). The system 300 includes CSDs 310a and 340. One or more components of the CSDs 310 and 340 are substantially similar to the components of the CSDs 210 and 240 and therefore are not enumerated herein.

The CSDs 310a and 340 may participate in a discovery process that yields a CSDs with open program slots for use. For example, if a particular computational program is not available on a CSD that is necessary to build a computational pipeline, such program can be either copied and replicated or migrated from one CSD to another CSD. For example, if CSDb 340 is working on a computational program for machine learning where it needs a hash function, it may through the discovery process identify that CSDa 310 has a hash function 226. In that case, the CSDb 340 may copy a hash program 226 from CSDa 210 to CSDb 240 to build a computational pipeline. In an alternative implementation, the CSDs 310, 340, may use a CF table 350 to complete the discovery process for the computational functionalities.

Figure 4:
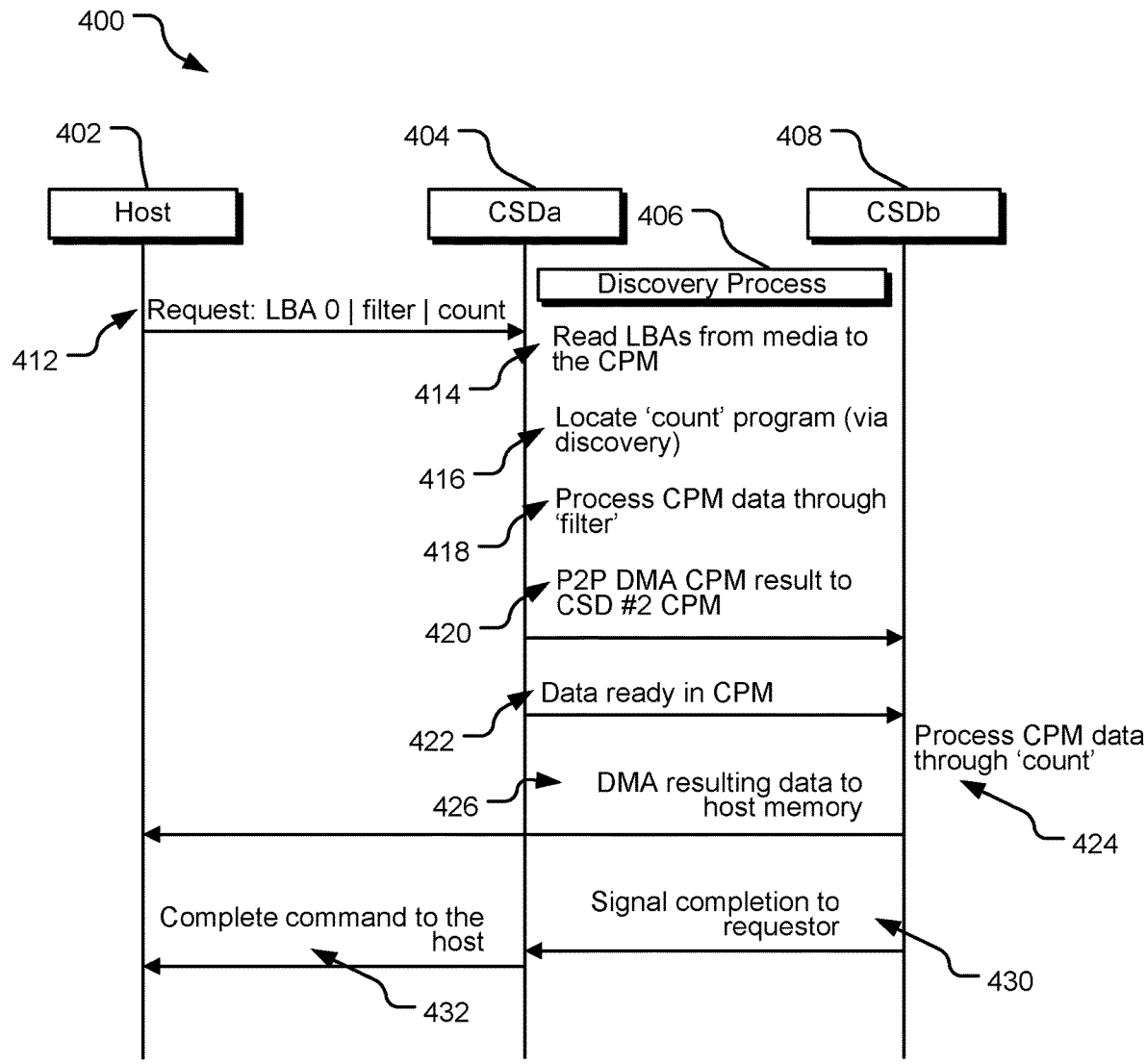
FIG. 4 illustrates example operations for building computational pipelines for increased performance of computational storage devices (CSDs).

FIG. 4 illustrates example operations 400 for building computational pipelines for increased performance of computational storage devices (CSDs). Specifically, the operations 400 are disclosed for building computational pipelines among CSDa 404 and CSDb 408 in response to a request for a set of operations from a host 402 using various steps of a discovery process 406. At 412 the host 402 may send a request to the CSDa 404 for performing a set of operations on an LBA range—namely a filter and a count operations. At 414, the CSDa 404 reads the LBAs from its media to its CPM. At 416, CSDa 404 determines that it does not have the count program, however, via the discovery process 406, it determines at 416 that the count program is located in the CSDb 408.

Subsequently, at 418 the CSDa 404 processes the data through its filter program. At 420, the output of the filter program is P2P DMA'd to CSDb 408. At 422, the CSDa 404 notifies the CSDb 408 that the data is ready for count process. At 424, CSDb 408 processes the data using its count process. Once the count process is complete, at 426, the resulting data may be DMA'd back to the memory of the host 402. At 430, CSDb 408 communicates a signal to the CSDa 404 that the filter process is complete and at 432, CSDa 404 communicates a signal to the host 402 that the set of requested operations is completed.

Figure 5:
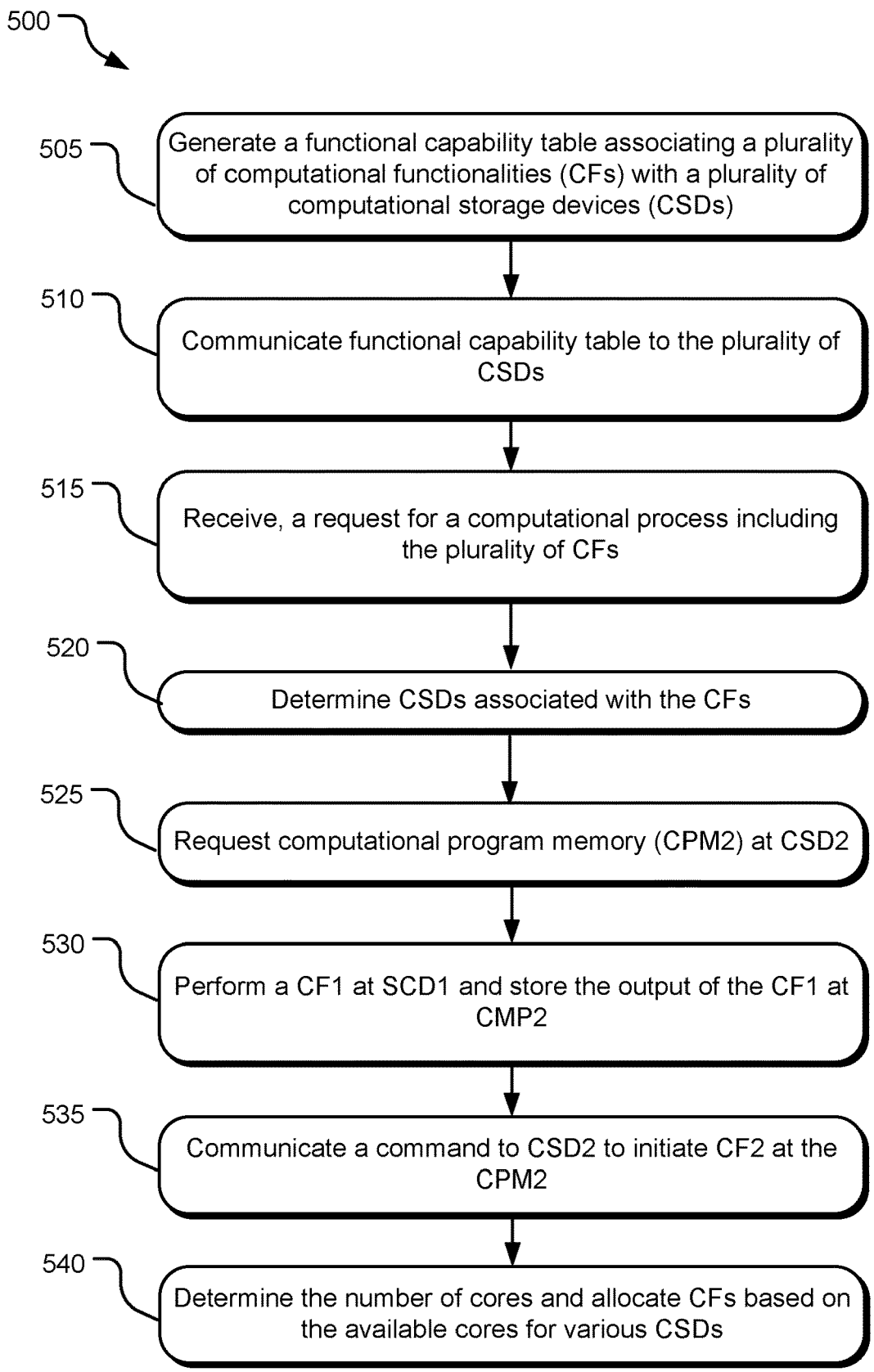
FIG. 5 illustrates alternative example operations for building computational pipelines for increased performance of computational storage devices (CSDs).
Figure 6:
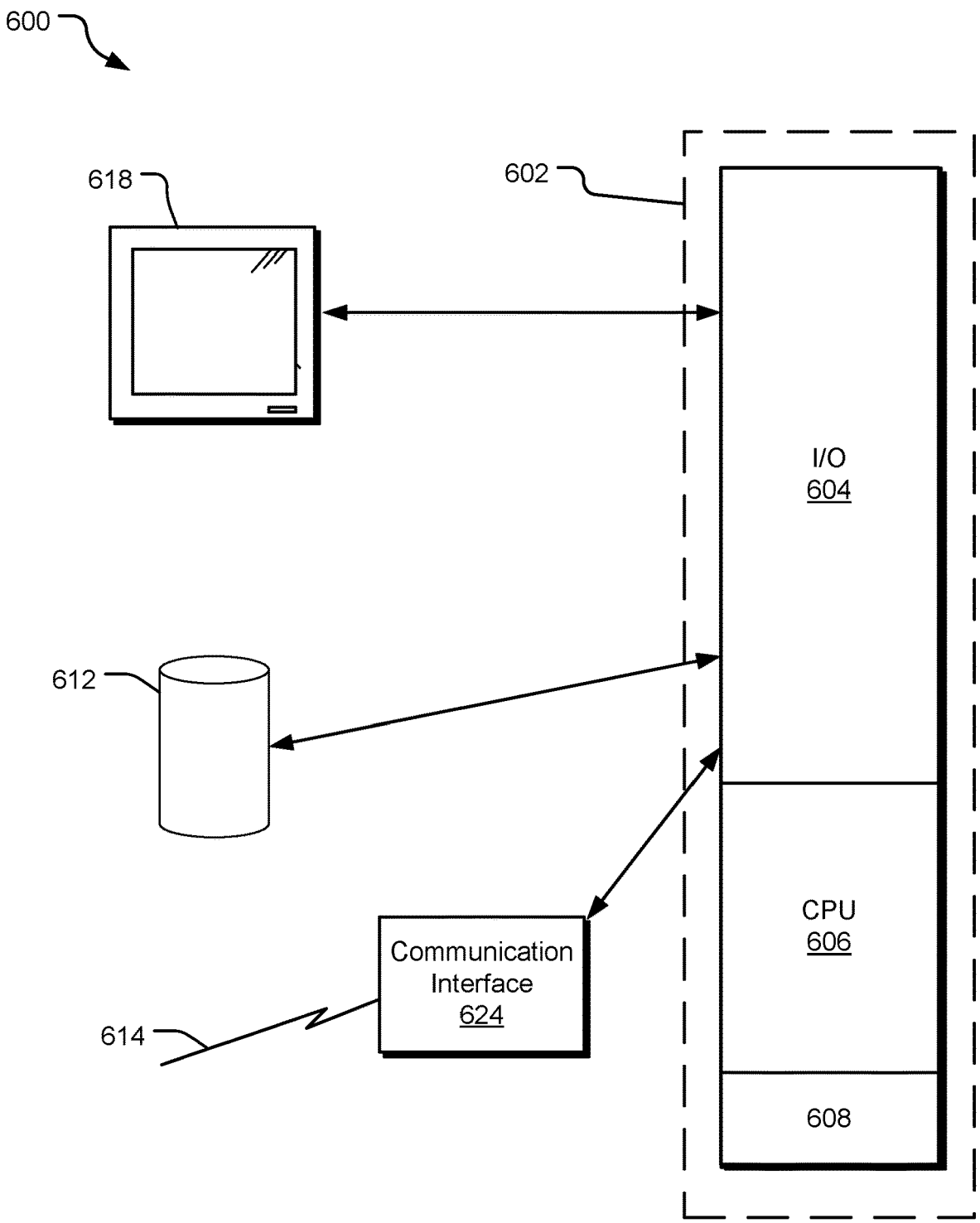
FIG. 6 illustrates an example processing system that may be useful in implementing the described technology.

FIG. 5 illustrates alternative example operations 500 for building computational pipelines for increased performance of computational storage devices (CSDs). An operation 505 generates a functional capability table associating a plurality of computational functionalities (CFs) with a plurality of computational storage devices (CSDs). For example, the plurality of computational functionalities (CFs) may include CF1 and CF2 where a first CSD is capable of performing CF1 and a second CSD is capable of performing CF2. An operation 510 communicates functional capability table to the plurality of CSDs. Subsequently, an operation 515 receives, a request for a computational process including the plurality of CFs. In response, an operation 520 determines the CSDs associated with the CFs.

An operation 525 requests computational program memory (CPM2) at a CSD2 that has a capability to perform CF2. An operation 530 performs CF1 at CSD1 and stores the output of the CF1 at CMP2 in the CSD2. For example, CSD1 may P2P DMA the output of the CF1 to the CMP2 at CSD2. An operation 535 communicates a command to CSD2 to perform CF2 on the output stored at CPM2.

In one implementation, an operation 540 allocates one or more of the CFs based on the numbers of computational cores available to the various CSDs. Specifically, the operation 540 may determine that a CF is associated with at least two CSDs, determines the number of computational cores at each of the two CSDs, and selects one of the two CSDs based on the number of computational cores available at each of the two CSDs.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs).

Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   generating, at a PCIe interface, a functional capability table associating a plurality of computational functionalities (CFs) with a plurality of computational storage devices (CSDs) communicatively connected to each other via the PCIe interface;
   communicating the functional capability table to each of the plurality of CSDs;
   receiving, at a first of the plurality of CSDs (CSD1), a request for a computational process including the plurality of CFs;
   determining that a first of the CFs (CF1) is associated with the CSD1 and a second of the CFs (CF2) is associated with a second of the plurality of CSDs (CSD2);
   requesting a computational program memory (CPM2) at the CSD2;
   performing the CF1 at CSD1 and storing the output of the CF1 at the CPM2; and
   communicating a command to the CSD2 to initiate CF2 on the CPM2.

2. The method of claim 1, wherein each of the CFs are implemented using enhanced Berkeley Packet Filter (eBPF) instruction set.

3. The method of claim 1, further comprising receiving, at the PCIe interface, the functional capabilities of the plurality of computational storage devices (CSDs).

4. The method of claim 3, wherein the functional capabilities of the plurality of computational storage devices (CSDs) are received in response to a CF discovery request communicated to each of the plurality of CSDs.

5. The method of claim 3, wherein the functional capabilities of one of the plurality of computational storage devices (CSDs) is received in response to an initiation of a communication connection with the one of the plurality of CSDs.

6. The method of claim 1, further comprising deallocating a computational program memory (CPM1) at the CSD1 after communicating a command to the CSD2 to initiate CF2 on the CPM2.

7. The method of claim 1, further comprising:
   determining that the second of the CFs (CF2) is associated with at least two CSDs (CSD2a and CSD2b);
   determining the computational load at each of the CSD2a and CSD2b; and
   selecting one of the CSD2a and CSD2b to perform CF2 based on their computational loads.

8. The method of claim 1, further comprising:
   determining that the second of the CFs (CF2) is associated with at least two CSDs (CSD2a and CSD2b);
   determining the number of available cores at each of the CSD2a and CSD2b; and
   selecting one of the CSD2a and CSD2b to perform CF2 based on their number of available cores.

9. The method of claim 1, further comprising:
   determining that a particular functional capability is required for a computational process pipeline;
   determining that the particular functional capability is not available on the first of the plurality of CSDs and that the particular functional capability is not available on the second of the plurality of CSDs; and
   copying the particular functional capability from the second of the plurality of CSDs to the first of the plurality of CSDs.

10. In a computing environment, a method performed at least in part on at least one processor, the method comprising:
    generating a functional capability table associating a plurality of computational functionalities (CFs) with a plurality of computational storage devices (CSDs) communicatively connected to each other via a PCIe interface;
    receiving, at a first of the plurality of CSDs (CSD1), a request for a computational process including the plurality of CFs;
    determining that a first of the CFs (CF1) is associated with the CSD1 and a second of the CFs (CF2) is associated with a second of the plurality of CSDs (CSD2);
    requesting a computational program memory (CPM2) at the CSD2;
    performing the CF1 at CSD1 and storing the output of the CF1 at the CPM2; and
    communicating a command to the CSD2 to initiate CF2 on the CPM2.

11. The method of claim 10, wherein one or more of the CFs are implemented using enhanced Berkeley Packet Filter (eBPF) instruction set.

12. The method of claim 10, wherein the functional capabilities of the plurality of computational storage devices (CSDs) are received at the PCIe interface in response to a CF discovery request communicated to each of the plurality of CSDs.

13. The method of claim 10, wherein the functional capabilities of one of the plurality of computational storage devices (CSDs) is received at the PCIe interface in response to an initiation of a communication connection with the one of the plurality of CSDs.

14. The method of claim 10, further comprising:
    determining that the second of the CFs (CF2) is associated with at least two CSDs (CSD2a and CSD2b);
    determining the number of available cores at each of the CSD2a and CSD2b; and
    selecting one of the CSD2a and CSD2b to perform CF2 based on their number of available cores.

15. The method of claim 10, further comprising;
    determining that a particular functional capability is required for a computational process pipeline;
    determining that the particular functional capability is not available on the first of the plurality of CSDs and that the particular functional capability is not available on the second of the plurality of CSDs; and
    copying the particular functional capability from the second of the plurality of CSDs to the first of the plurality of CSDs.

16. One or more tangible computer-readable storage media encoding computer-executable instructions for executing on a computer system a computer process, the computer process comprising:
    generating, at a PCIe interface, a functional capability table associating a plurality of computational functionalities (CFs) with a plurality of computational storage devices (CSDs) communicatively connected to each other via the PCIe interface;
    communicating the functional capability table to each of the plurality of CSDs;
    receiving, at a first of the plurality of CSDs (CSD1), a request for a computational process including the plurality of CFs;
    determining that a first of the CFs (CF1) is associated with the CSD1 and a second of the CFs (CF2) is associated with a second of the plurality of CSDs (CSD2);

requesting a computational program memory (CPM2) at the CSD2; and performing the CF1 at CSD1 and storing the output of the CF1 at the CPM2.

17. One or more tangible computer-readable storage media of claim 16, wherein one or more of the CFs are implemented using enhanced Berkeley Packet Filter (eBPF) instruction set.

18. One or more tangible computer-readable storage media of claim 16, wherein the functional capabilities of the plurality of computational storage devices (CSDs) are received at the PCIe interface in response to a CF discovery request communicated to each of the plurality of CSDs.

19. One or more tangible computer-readable storage media of claim 16, wherein the functional capabilities of one of the plurality of computational storage devices (CSDs) is received at the PCIe interface in response to an initiation of a communication connection with the one of the plurality of CSDs.

20. One or more tangible computer-readable storage media of claim 16, wherein the computer process further comprising:

determining that the second of the CFs (CF2) is associated with at least two CSDs (CSD2*a* and CSD2*b*);

determining the number of available cores at each of the CSD2*a* and CSD2*b*; and selecting one of the CSD2*a* and CSD2*b* to perform CF2 based on their number of available cores.

\* \* \* \* \*